United States Patent [19]

Lemin et al.

[11] 3,776,716

[45] Dec. 4, 1973

[54] HERBICIDAL METHOD AND COMPOSITIONS COMPRISING DIPHENAMID AND 2,4-D

[75] Inventors: Alan J. Lemin, Richland Township; Arnolds Steinhards; George Swank, both of Kalamazoo, all of Mich.

[73] Assignee: The Upjohn Company, Kalamazoo, Mich.

[22] Filed: Oct. 10, 1969

[21] Appl. No.: 865,485

Related U.S. Application Data

[63] Continuation-in-part of Ser. No. 385,032, July 24, 1964, abandoned, which is a continuation-in-part of Ser. No. 98,316, March 27, 1961, abandoned.

[52] U.S. Cl. ............................. 71/117, 71/118

[51] Int. Cl. .............................................. A01n 9/24
[58] Field of Search ....................... 71/117, 115, 118

[56] References Cited
UNITED STATES PATENTS

| | | | |
|---|---|---|---|
| 3,063,822 | 11/1962 | Sober | 71/118 X |
| 3,120,434 | 2/1964 | Pohland | 71/118 |

*Primary Examiner*—James O. Thomas, Jr.
*Attorney*—George T. Johannesen

[57] ABSTRACT

Herbicidal methods and compositions containing, as the essential active ingredients, an N,N-disubstituted-$\alpha,\alpha$-diphenylacetamide and 2,4-dichlorophenoxyacetic acid.

4 Claims, No Drawings

HERBICIDAL METHOD AND COMPOSITIONS COMPRISING DIPHENAMID AND 2,4-D

This application is a continuation-in-part of application, Ser. No. 385,032 filed July 24, 1964, which in turn is a continuation-in-part of application, Ser. No. 98,316 filed Mar. 27, 1961, both now abandoned.

This invention pertains to novel compositions of matter and a process. More particularly, the invention is directed to herbicidal compositions containing, as the essential active ingredients, an N,N-disubstituted-$\alpha,\alpha$-diphenylacetamide and 2,4-dichlorophenoxyacetic acid (2,4-D). Likewise, the invention is directed to the process for controlling undesired plants with said compositions.

The problem of weed damage to field crops is as ancient as agriculture itself; and, in recent years, increased labor costs have stimulated investigation of other than mechanical methods for controlling weeds. Weeds damage field crops, pastures, and hayfields, and reduce productivity by competing with the crop and forage plants for mineral nutrients, nitrogen, water, and sunlight. In addition to economic damage to field crops, pastures, and hayfields, weeds such as dandelions and crab-grass frustrate the establishment and maintenance of uniform turfs on home lawns and golf courses; and water weeds such as cattails and canary-grass obstruct drainage and irrigation ditches. Among the methods for combating weeds that have been tried, selective chemical inhibition appears to hold promise of being efficacious and economical, and a great many chemical herbicides have been contrived.

An object of this invention is to provide novel compositions of enhanced herbicidal activity for controlling undesired plants. Another object of the invention is to provide herbicidal compositions containing mutually hyperactivated herbicides for preventing the germination of undesired plant seeds and for controlling the growth of noxious weeds in field crops, pastures, turfs, ditches, railroad rights-of-way, and other areas where weed control is desired. A further object of the invention is to provide herbicidal compositions of 2,4-dichlorophenoxyacetic acid and N,N-disubstituted-$\alpha,\alpha$-diphenylacetamide for controlling noxious weeds such as Johnson-grass, crab-grass, pigweed, quack-grass, wild oats, foxtails, Bermuda-grass, mustards, purslane, lambs-quarters, sheep sorrel, bindweed, ragweed, and like noxious weeds in crops such as cereal grains and sorghum, in turfs, and other areas.

The 2,4-dichlorophenoxyacetic acid active ingredient of the novel compositions of this invention is a known herbicide, and it is widely used for the control of weeds. It is particularly useful in the selective control of undesired broad-leafed weeds growing in association with tolerant plants. The N,N-disubstituted-$\alpha,\alpha$-diphenylacetamide active ingredient of the compositions also possesses herbicidal activity and is represented by the formula

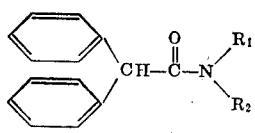

wherein $R_1$ and $R_2$ are selected from the class consisting of alkyl of from one to three carbon atoms, inclusive, i.e., methyl, ethyl, propyl, and isopropyl; and alkenyl of from 3 to 4 carbon atoms, inclusive, i.e., allyl, methallyl, 3-butenyl, and crotyl. Thus, the N,N-disubstituted-$\alpha,\alpha$-diphenyl-acetamides include both N,N-dialkyl- and N,N-dialkenyl-$\alpha,\alpha$-diphenylacetamides.

In accordance with the invention, it has been found that 2,4-dichlorophenoxyacetic acid and N,N-disubstituted $\alpha,\alpha$-diphenylacetamide (compounds of Formula I) are mutually hyperactivated in the presence of each other, and that herbicidal compositions containing them in association produce more effective control of weeds than either active ingredient when used alone. The novel herbicidal compositions of the invention can be used for preventing germination of plant seeds and controlling growth of plants by contacting said seeds and plants with a herbicidally effective amount thereof.

The 2,4-dichlorophenoxyacetic acid can be employed in the compositions of the invention in any of its herbicidally effective forms, for example, the free acid, the amide, the alkali metal, alkaline earth metal, ammonium, and amine salts, and the esters. The alkali metal salts include, e.g., sodium, potassium, and lithium salts. The alkaline earth metal salts include, e.g., calcium and magnesium salts. The amine salts include, e.g., mono-, di-, and tri-ethanolamine, triethylamine, isopropanolamine, isopropylamine, and like salts. The esters include, e.g., methyl, ethyl, isopropyl, butyl, and amyl, as well as esters of butoxyethanol, polyethylene glycol butyl ether, propylene glycol, tetrahydrofurfuryl alcohol, ethoxyethoxypropanol, and like esters.

2,4-Dichlorophenoxyacetic acid is readily prepared by reaction of monochloroacetic acid with sodium 2,4-dichlorophenoxide. N,N-disubstituted-$\alpha,\alpha$-diphenylacetamides (compounds of Formula I wherein $R_1$ and $R_2$ are alkyl) are known compounds, and they can be readily prepared by heating diphenylacetic acid with thionyl chloride to form diphenyl-acetyl chloride; and the forming the amides by reacting the diphenylacetyl chloride with an excess of a dialkylamine, e.g., dimethylamine, diethylamine, dipropylamine and diisopropylamine. Similarly, the N,N-dialkenyl-$\alpha,\alpha$-diphenylacetamides (compounds of Formula I wherein $R_1$ and $R_2$ are alkenyl) are readily prepared by substitution reaction between a diphenylacetyl halide, e.g., diphenylacetyl chloride, and the desired dialkenylamine [e.g., dimethallylamine and N-methallylcrotylamine (Tamele et al., Ind. Eng. Chem. 33, 115–120, 1941), di-3-butenylamine, (Reppe et al., Ann. 596, 80–158, 1955), dicrotylamine (Berthold, Chem. Ber. 90, 2743–2747, 1957) and diallylamine] in the presence of an inert organic solvent. Suitable inert organic solvents include benzene, diethyl ether, dioxane, and toluene. Stoichiometrically, the reaction requires one mole of amine for each mole of acid halide. However, the substitution releases one mole of hydrogen chloride; so an excess of amine, preferably at least one mole excess, should be provided. In lieu of an excess of amine, another suitable acid acceptor, for example, triethylamine, pyridine, picoline, sodium hydroxide, and the like can be utilized. The reaction can be carried out at temperatures in the range of about 0° C. to about 100° C. or up to the reflux temperature of the solvent. The N,-N-dialkenyl-$\alpha,\alpha$-diphenylacetamide product is recovered by conventional methods, for example, filtering, washing to remove amine salts, and recrystallization.

The herbicidal compositions according to the invention include solutions, emulsions, suspensions, dispersible powders, emulsifiable concentrates, granular formulations, and dusts. All of these compositions comprise an active ingredient component consisting of 2,4-dichlorophenoxyacetic acid and N,N-disubstituted-$\alpha,\alpha$-diphenylacetamide in dispersed or readily dispersible form and a carrier, with or without adjuvants. In general, selective inhibition of undesired weed species in the presence of field crops or in turf is obtained by employing a phytonomic carrier, that is to say, a carrier which can be applied to plants without phytotoxicity or other adverse effects. On the other hand, when general herbicidal activity is desired, a phytotoxic carrier, for example, high-boiling mineral oil fractions or chlorohydrocarbons can be used.

The newly discovered mutual hyperactivation of 2,4-dichlorophenoxyacetic acid and N,N-disubstituted-$\alpha,\alpha$-diphenylacetamide is observed over a wide range of proportions. Hence, the active ingredient component of the compositions of the invention can vary from about 10 percent to about 90 percent of 2,4-dichlorophenoxyacetic acid and correspondingly from about 90 percent to about 10 percent of the N,N-disubstituted-$\alpha,\alpha$-diphenylacetamide. Preferably, the proportions are from about 25 percent to about 75 percent of one and, correspondingly, from about 75 percent to about 25 percent of the other. The proportion of active ingredients, relative to each other, will be influenced somewhat by the proportion of broad-leafed and grassy weeds in the area to be controlled. For example, an area infested with a high proportion of broad-leafed weeds is advantageously treated with a composition comprising a major proportion of 2,4-D. On the other hand, an area infested with a high proportion of grassy weeds is advantageously treated with a composition comprising a major proportion of N,N-disubstituted-$\alpha,\alpha$-diphenylacetamide.

The compositions of the invention can be applied at relatively low rates of active ingredients per acre for preventing the germination of seeds and controlling the growth of plants. The compositions give complete or substantially complete suppression of crab-grass, foxtails, Johnson-grass, pigweed, quack-grass, mustards, ragweed, dandelion, wild carrot, bindweed, and purslane with little or no phytotoxic effect on field crop plants such as corn, wheat, and rye, and desirable turf grasses. In general, the aqueous compositions are applied in concentrations of from about 100 ppm (parts per million) to about 30,000 ppm of active ingredients, preferably about 700 to about 12,000 ppm, at the rate of 0.25 to 8 lbs. per acre. It will be understood, of course, that a choice of concentration of active ingredients depends upon the method of application as well as the type of composition and the degree of herbicidal control desired. In general, concentration is not critical within the range indicated since an effective quantity of active ingredients can be applied to a given area by using greater quantities of a low concentration than of a higher concentration. The concentration of active ingredients in the dispersible powder and emulsifiable concentrates from which the aqueous compositions are prepared can be as high as 99.5 percent by weight. The concentration of active ingredients in the dust and granular formulations of the invention can vary from about 0.25 percent to about 80 percent or more, but advantageously is of the order of about 0.5 percent to 20 percent.

The granular formulations of this invention are prepared with about 0.25 percent to about 80 percent, preferably 0.5 percent to 20 percent by weight, of active ingredients and a granular carrier, for example, vermiculite, pyrophyllite, and attapulgite. The active ingredients can be dissolved in a volatile solvent such as ethylene dichloride, methylene chloride, acetone, and the like, and sprayed on the granular carrier as it is mixed and tumbled. The granules are then dried. The granular carrier can range in particle size from about 10 to about 60 mesh, preferably about 30 to 60 mesh.

The herbicidal dust compositions of the invention are prepared by intimate admixture of from about 0.25 percent to about 80 percent by weight, preferably 0.5 percent to 20 percent of the active ingredients, with a solid pulverulent carrier which maintains the composition in a dry, free-flowing state. The herbicidal dusts of the invention can be prepared by admixing the active ingredients with a solid diluent and then milling. Preferably, however, the active ingredients are dissolved in a volatile organic solvent, of the kinds indicated above, and then sprayed on the solid carrier so as to assure thorough distribution. The mixture is then dried and milled to the desired size, e.g., less than about 60 microns.

Solid carriers that can be used in the dust compositions of the invention include the natural clays such as China clay and bentonite, minerals in the natural state such as talc, pyrophyllite, quartz, diatomaceous earth, fuller's earth, chalk, and rock phosphate, and the chemically modified minerals such as washed bentonite, precipitated calcium phosphate, precipitated calcium carbonate, precipitated calcium silicate, and colloidal silica. The solid diluents which can be employed in the compositions also include solid, compounded fertilizers. Such solid compositions can be applied to soil in the form of dusts by the use of conventional machinery.

Dispersible powders are prepared by incorporating a surfactant in a dust composition prepared as described above. Such a dispersible powder can be dispersed in water to any desired concentration and applied to soil by conventional spray equipment. Conveniently, the dispersible powders are formulated with concentrations of the active ingredients up to about 80 percent, preferably about 10 percent to 60 percent by weight. Surfactants useful in preparing such dispersible powder compositions include alkyl sulfates and sulfonates, alkyl aryl sulfonates, sulfosuccinate esters, polyoxyethylene sulfates, polyoxyethylene-sorbitan monolaurate, alkyl aryl polyether sulfates, alkyl aryl polyether alcohols, alkyl naphthalene sulfonates, alkyl quaternary ammonium salts, sulfated fatty acids and esters, sulfated fatty acid amides, glycerol mannitan laurate, polyalkylether condensates of fatty acids, lignin sulfonates, and the like. A preferred class of surfactants includes blends of sulfonated oils and polyalcohol carboxylic acid esters (Emcol H-77), blends of polyoxyethylene ethers and oil-soluble sulfonates (Emcol H-400), blends of alkyl aryl sulfonates and alkylphenoxy polyethoxy ethanols (Tritons X-151, X-161, and X-171), e.g., about equal parts of sodium kerylbenzene sulfonate and isooctylphenoxy polyethoxy ethanol containing about 12 ethoxy groups, and blends of calcium alkyl aryl sulfonates and polyethoxylated vegetable oils (Agrimul N₄S). It will be understood, of course, that the sulfate and sulfonate surfactants suggested above will preferably be used in the form of their soluble salts, for example, their sodium salts. All of these surfactants are capable of reducing the surface tension of water to less than about 40 dynes per centimeter in concentrations of about 1 percent or less. The dispersible powder compositions can be formulated with a mixture of surfactants of the types indicated if desired.

A suitable dispersible powder formulation is obtained by blending and milling 327 lbs. of Georgia clay, 4.5 lbs. of isooctylphenoxy polyethoxy ethanol (Triton X-100) as a wetting agent, 9 lbs. of a polymerized sodium salt of substituted benzoid long-chain sulfonic acid (Daxad 27) as a dispersing agent, and 113 lbs. of the active ingredients. The resulting formulation has the following percentage composition (parts herein are by weight unless otherwise specified):

| | |
|---|---|
| Active ingredients | 25% |
| Isooctylphenoxy polyethoxy ethanol | 1% |
| Polymerized sodium salt of substituted benzoid long-chain sulfonic acid | 2% |
| Georgia clay | 72% |

This formulation, when dispersed in water at the rate of 10 lbs. per 100 gals., gives a spray formulation containing about 0.3 percent (3000 ppm) active ingredients which can be applied to soil, undesired vegetation, or turf at the rate of 40 gals. per acre to give a total application of active ingredients of 1 lb. per acre.

Emulsifiable concentrates in accordance with the invention are prepared by dissolving the active ingredients (e.g., an N,N-disubstituted-$\alpha,\alpha$-diphenylacetamide and an ester or amine salt of 2,4-dichlorophenoxyacetic acid) and a surfactant in a substantially water-immiscible solvent carrier (i.e., a solvent carrier which is soluble in water to the extent of less than 2.5 percent by volume at temperatures of the order of 20° to 30° C.), for example, cyclohexanone, methyl propyl ketone, summer oils, ethylene dichloride, aromatic hydrocarbons such as benzene, toluene, and xylene, and high-boiling petroleum hydrocarbons such as kerosene, diesel oil, and the like. If desired, a cosolvent such as methyl ethyl ketone, acetone, isopropanol and the like can be included with the solvent carrier in order to enhance the solubility of the active ingredients. Aqueous emulsions are then prepared by mixing with water to give any desired concentration of active ingredients. The surfactants which can be employed in the aqueous emulsions of the invention are those types noted above. Mixtures of surfactants can be employed if desired.

Advantageously, the concentration of active ingredients in the emulsifiable concentrates can range from about 5 percent to about 50 percent by weight, preferably from about 10 percent to 40 percent. A concentrate comprising 20 percent (by weight) of active ingredients dissolved in a water-immiscible solvent of the kind noted above can be admixed with an aqueous medium in the proportions of about 13 ml. of concentrate with 1 gal. of medium to give a mixture containing about 700 parts of active ingredients per million parts of liquid carrier. Similarly, 1 qt. of a 20 percent concentrate mixed with 40 gals. of water provides about 1,200 ppm of active ingredients. In the same manner, more concentrated solutions of active ingredients can be prepared.

The concentrate compositions of the invention which are intended for use in the form of aqueous dispersions or emulsions can also comprise a humectant, that is to say, an agent which will delay the drying of the composition in contact with material to which it has been applied. Suitable humectants include glycerol, diethylene glycol, solubilized lignins, such as calcium lignosulfonate, and the like.

The rates of application to areas of soil, undesired vegetation, or turfs to be protected from noxious weeds will depend upon the species of plants to be controlled, the presence or absence of desirable species, the season of year at which treatment is undertaken, and the method and efficiency of application. In general, selective herbicidal activity is obtained when the active ingredients are applied at the rate of about 0.125 to about 25 lbs. per acre, preferably at the rate of 0.25 to 8 lbs. per acre.

The compositions containing 2,4-dichlorophenoxyacetic acid and N,N-disubstituted-$\alpha,\alpha$-diphenylacetamides, according to the invention, can be applied to vegetation and interfused with soil by conventional methods. For example, an area of soil can be treated prior to or after seeding by spreading a granular formulation in accordance with the invention on the plant growth medium with or without mixing. For home lawn application, a conventional hand-propelled spreader is satisfactory. Dispersible powder suspensions, emulsions, or solutions can be sprayed from boom-type power sprayers or from hand-operated knapsack sprayers. Dusts can be applied by power dusters, or by hand-operated dusters. Dusts and granular formulations can also be applied at the time of seeding in bands spanning the seeded rows.

The term "soil" is employed in the present specification and claims in its broadest sense. Hence the term "soil" refers to a substance in which plants can take root and grow, and includes not only earth but compost, manure, muck, humus, sand, and the like.

The following examples are illustrative or the process and products of the present invention, but are not to be construed as limiting.

EXAMPLE 1

An emulsifiable concentrate having the following percentage composition:

| | |
|---|---|
| N,N-dimethyl-$\alpha,\alpha$-diphenylacetamide | 10% |
| Triethylamine salt of 2,4-dichlorophenoxyacetic acid | 30% |
| Technical alkyl naphthalene boiling at 238° to 293° C. (Velsicol AR50) | 13.7% |
| Xylene | 12.3% |
| Isopropanol | 11.3% |
| Ethylene dichloride | 17.7% |
| Blend of alkyl aryl sulfonates and Alkylphenoxy polyethoxy ethanols (Triton X-151) | 5.0% | was prepared by mixing 10 lbs. of N,N-dimethyl-$\alpha,\alpha$-diphenyl-acetamide, 30 lbs. of the triethylamine salt of 2,4-dichlorophenoxyacetic acid, 13.7 lbs. of technical alkyl naphthalene boiling at 238° to 293° C. (Velsicol AR50), 12.3 lbs of xylene, 11.3 lbs. of isopropanol, 17.7 lbs. of ethylene dichloride, and 5.0 lbs. of a blend of alkyl aryl sulfonates and alkylphenoxy polyethoxy ethanols (Triton X-151).

1.67 lbs. of the concentrate mixed with 20 gals. of water gave a spray emulsion containing 1,000 ppm of N,N-dimethyl-α,α-diphenylacetamide and 3,000 ppm of the triethylamine salt of 2,4-dichlorophenoxyacetic acid.

EXAMPLE 2

A dispersible powder concentrate having the following percentage composition:

| | |
|---|---|
| N,N-diethyl-α,α-diphenylacetamide | 20% |
| Ethyl ester of 2,4-dichlorophenoxyacetic acid | 30% |
| Kaolinite clay (finely divided) | 46% |
| Sodium salt of condensed mononaphthalene sulfonic acid (Lomar D) | 4% | was prepared by mixing 20 g. of N,N-diethyl-α,α-diphenyl-acetamide, 30 g. of the ethyl ester of 2,4-dichlorophenoxy-acetic acid, 46 g. of kaolinite clay, and 4 g. of the sodium salt of condensed mononaphthalene sulfonic acid (Lomar D). The mixture was milled to an average particle size of 5 to 30 microns.

EXAMPLE 3

A dispersible powder concentrate having the following percentage composition:

| | |
|---|---|
| N,N-diallyl-α,α-diphenylacetamide | 5.8% |
| Diethanolamine salt of 2,4-dichlorophenoxyacetic acid | 40% |
| Polymerized sodium salt of substituted benzoic long-chain sulfonic acid (Daxad 27) | 9.2% |
| Kaolinite | 45.0% | was prepared by mixing 31.6 g. of N,N-diallyl-α,α-diphenyl-acetamide, 218 g. of the diethanolamine salt of 2,4-dichlorophenoxyacetic acid, 50 g. of a polymerized sodium salt of substituted benzoic long-chain sulfonic acid (Daxad 27), and 245 g. of kaolinite. The mixture was milled to a particle size averaging 5 to 30 microns. It was suspended in 10 gals. of water, giving an aqueous spray containing about 820 ppm of N,N-diallyl-α,α-diphenylacetamide and about 5680 ppm of the diethanolamine salt of 2,4-dichlorophenoxyacetic acid.

EXAMPLE 4

A dust formulation having the following percentage composition:

| | |
|---|---|
| N,N-diethyl-α,α-diphenylacetamide | 2.5% |
| Ethyl ester of 2,4-dichlorophenoxyacetic acid | 2.5% |
| Vermiculite (30/60 mesh) | 95% | was prepared by spraying a solution of 150 g. of N,N-diethyl-α,α-diphenylacetamide and 150 g. of the ethyl ester of 2,4-dichlorophenoxyacetic acid in 1,000 ml. of methylene chloride on 5700 g. of vermiculite (30/60 mesh) while the vermiculite was being tumbled and stirred so as to assure even distribution. The methylene chloride was then evaporated, leaving the N,N-diethyl-α,α-diphenylacetamide and the ethyl ester of 2,4-dichlorophenoxyacetic acid adsorbed on the vermiculite. The treated vermiculite was then pulverized to a particle size averaging 5 to 30 microns.

EXAMPLE 5

A granular formulation having the following percentage composition:

| | |
|---|---|
| N,N-diethyl-α,α-diphenylacetamide | 2.2% |
| Ethyl ester of 2,4-dichlorophenoxyacetic acid | 1.5% |
| Vermiculite (30/60 mesh) | 96.3% | was prepared by spraying a solution of 132 g. of N,N-diethyl-α,α-diphenylacetamide and 90 g. of the ethyl ester of 2,4-dichlorophenoxyacetic acid in 1,000 ml. of methylene chloride on 5780 g. of vermiculite (30/60 mesh) while the vermiculite was being tumbled and stirred so as to assure even distribution. The methylene chloride was then evaporated, leaving the N,N-diethyl-α,α-diphenylacetamide and the ethyl ester of 2,4-dichlorophenoxyacetic acid adsorbed on the vermiculite.

We claim:

1. Herbicidal composition comprising, as the essential active ingredient, 0.25 percent to 80 percent of a mixture of 50 percent 2,4-dichlorophenoxyacetic acid and 50 percent N,N-dimethyl-α,α-diphenylacetamide, and the balance a dispersible carrier therefore.

2. Herbicidal composition comprising, as the essential active ingredient, 0.25 percent to 80 percent of a mixture of 75 percent 2,4-dichloro-phenoxyacetic acid and 25 percent N,N-dimethyl-α,α-diphenylacetamide, and the balance a dispersible carrier therefor.

3. The method of preventing germination of seeds and controlling growth of plants which comprises contacting such seeds and plants with a herbicidally effective amount of a composition comprising an active component of 50 percent 2,4-dichlorophenoxyacetic acid and 50 percent N,N-dimethyl-α,α-diphenylacetamide.

4. The method of preventing germination of seeds and controlling growth of plants which comprises contacting such seeds and plants with a herbicidally effective amount of a composition comprising an active component of 75 percent 2,4-dichlorophenoxyacetic acid and 25 percent N,N-dimethyl-α,α-diphenylacetamide.

* * * * *